(12) United States Patent
Yamaguchi et al.

(10) Patent No.: US 11,094,491 B2
(45) Date of Patent: Aug. 17, 2021

(54) ATTACHMENT STRUCTURE BETWEEN COVER AND HOUSING, AND FUSIBLE LINK UNIT

(71) Applicant: Yazaki Corporation, Tokyo (JP)

(72) Inventors: Makoto Yamaguchi, Makinohara (JP); Ryu Okada, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 15 days.

(21) Appl. No.: 16/661,055

(22) Filed: Oct. 23, 2019

(65) Prior Publication Data

US 2020/0168423 A1 May 28, 2020

(30) Foreign Application Priority Data

Nov. 26, 2018 (JP) .............................. JP2018-220041

(51) Int. Cl.
*H01H 85/20* (2006.01)
*H01H 1/58* (2006.01)
*H01H 85/02* (2006.01)
*H01M 50/572* (2021.01)

(52) U.S. Cl.
CPC .......... *H01H 85/2045* (2013.01); *H01H 1/58* (2013.01); *H01H 85/0241* (2013.01); *H01M 50/572* (2021.01); *H01H 2001/5877* (2013.01); *H01H 2085/025* (2013.01); *H01M 2200/103* (2013.01); *H01M 2200/20* (2013.01)

(58) Field of Classification Search
CPC .......... H01H 85/0078; H01H 85/0241; H01H 85/044; H01H 85/2045
See application file for complete search history.

(56) References Cited

U.S. PATENT DOCUMENTS

| 9,490,095 | B2 * | 11/2016 | Matsumoto | ........ H01H 85/0078 |
| 9,508,518 | B2 * | 11/2016 | Nohara | .............. H01H 85/0241 |
| 9,748,066 | B2 * | 8/2017 | Matsumoto | ............. H01M 2/30 |
| 9,972,823 | B2 * | 5/2018 | Onoda | .................... H01H 85/12 |
| 2015/0155120 | A1 | 6/2015 | Nohara et al. | |

FOREIGN PATENT DOCUMENTS

| JP | 05198249 A | 8/1993 |
| JP | 2014-35995 A | 2/2014 |

\* cited by examiner

*Primary Examiner* — Jean F Duverne
(74) *Attorney, Agent, or Firm* — Sughrue Mion, PLLC

(57) ABSTRACT

An attachment structure includes a housing and a plate-shaped cover attached to the housing. The cover has a locking portion to fix the cover to the housing. The housing has a locked portion engaged with the locking portion to regulate a movement of the cover in a direction separating from the housing. The attachment structure is configured to engage the locking portion and the locked portion at an engagement place while the cover and the housing are pressed each other in directions separating from each other at a pressing place distant from the engagement place, and to form a space between the cover and the housing in a region between the pressing place and the engagement place, when the cover is attached to the housing.

3 Claims, 7 Drawing Sheets

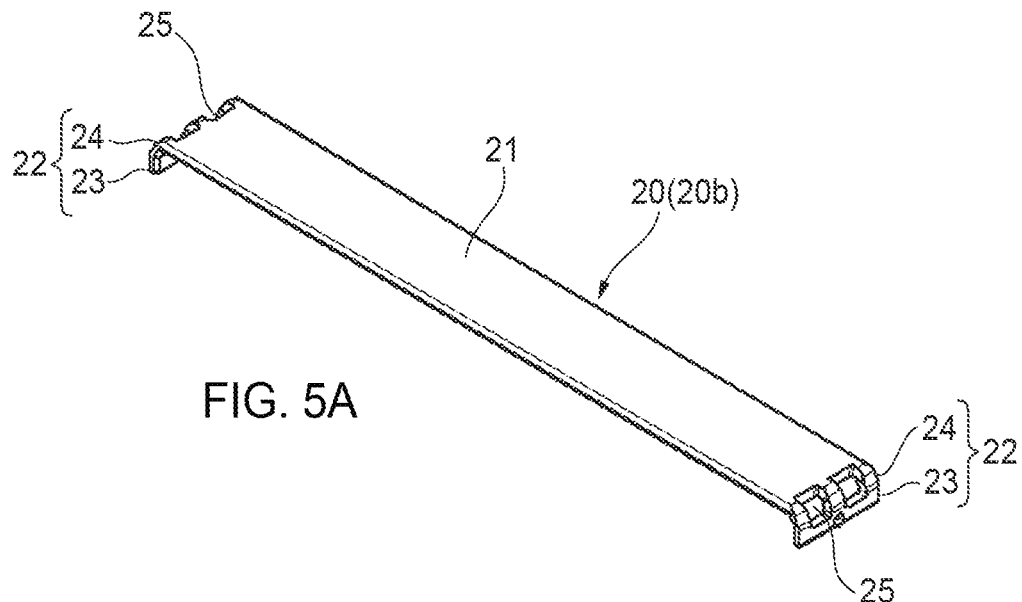
FIG. 5A
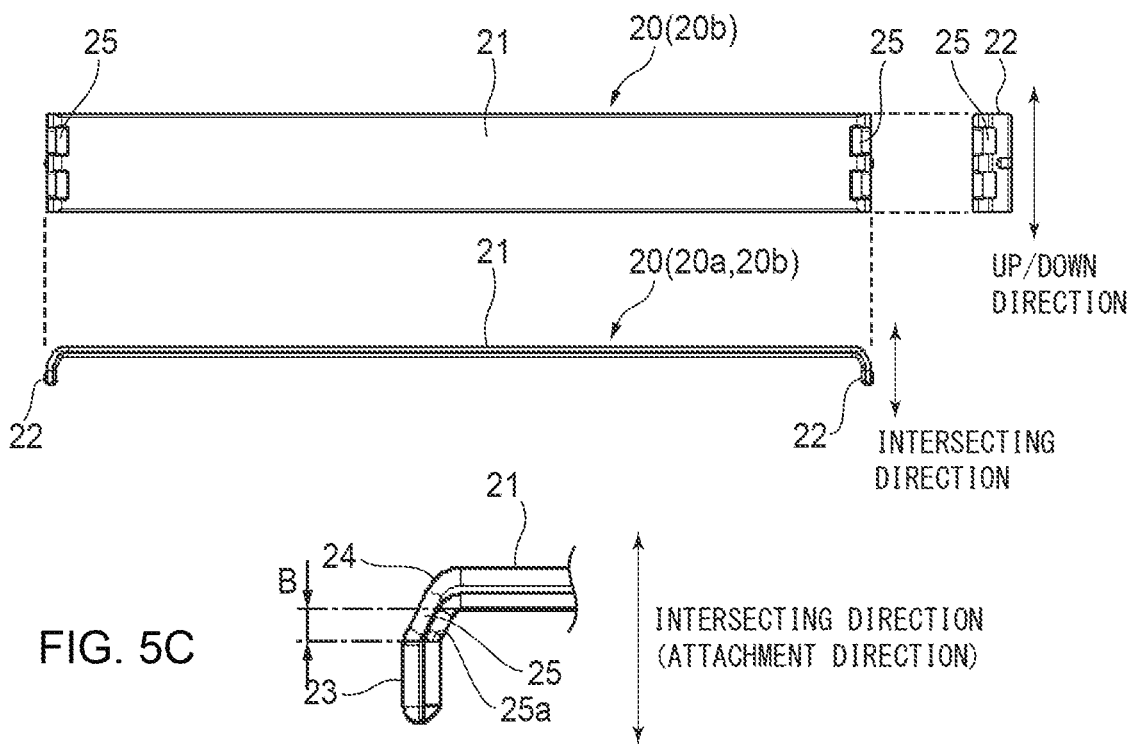
FIG. 5B
FIG. 5C

ATTACHMENT STRUCTURE BETWEEN COVER AND HOUSING, AND FUSIBLE LINK UNIT

CROSS-REFERENCES TO RELATED APPLICATION(S)

This application is based on and claims priority from Japanese Patent Application No. 2018-220041 filed on Nov. 26, 2018, and the entire contents of which are incorporated herein by reference.

BACKGROUND

Field of the Invention

The present invention relates to an attachment structure between a cover and a housing, and a fusible link unit provided between a power supply and a load (for example, between an on-vehicle battery and various equipment).

Description of Related Art

A fusible link unit (also referred to as fuse unit) directly attached to an on-vehicle battery has been known in the background art. Such a fusible link unit is generally provided with a housing made of an insulating resin, and a bus bar (specifically, a conductive member including fuse elements having fusible portions, terminals, etc.) which is a circuit body received in the housing. The fusible portion of each fuse element can be fused as soon as a current beyond a rated current of the fuse element flows into the fuse element.

For example, one of fusible link units in the background art (hereinafter referred to as "background-art unit") has opening portions in a housing packaging. The opening portions are located correspondingly to fusion portions. The background-art unit also has a cover which is attached to the housing so as to cover the opening portions. In the background-art unit, engagement protrusions provided in the housing are engaged with engagement hole portions provided in opposite end portions of the cover so that the cover can be fixed to the housing.

As for details of the above terminal-attached electric wire, refer to JP 2014-035995 A.

SUMMARY

In the background-art unit, the protrusions of the housing are engaged with the hole portions of the cover so that the cover can be fixed to the housing. On the other hand, a slight gap (so-called clearance) is generally provided in design between each hole portion of the cover and each protrusion of the housing. Therefore, when the background-art unit is actually mounted on a vehicle or the like, relative movement (so-called looseness) may occur between the cover and the housing correspondingly to the gap between the hole portion and the protrusion due to vibration of the vehicle or the like. Such relative movement may cause abnormal noise or the like. It is therefore desired to suppress the relative movement as much as possible. Not to say, also in a structure other than the fusible link unit, it is desired to suppress unintentional relative movement between a cover and a housing.

An object of the invention is to provide an attachment structure capable of keeping proper attachment between a cover and a housing, and a fusible link unit using the attachment structure.

Embodiments of the present invention provide the following items [1] to [3]:

[1] An attachment structure comprising a housing and a plate-shaped cover attached to the housing,
the cover having a locking portion to fix the cover to the housing,
the housing having a locked portion engaged with the locking portion to regulate a movement of the cover in a direction separating from the housing,
the attachment structure being configured to engage the locking portion and the locked portion at an engagement place while the cover and the housing being pressed each other in directions separating from each other at a pressing place distant from the engagement place, and to form a space between the cover and the housing in a region between the pressing place and the engagement place, upon attachment of the cover to the housing.

[2] The attachment structure according to the item [1], wherein
the housing has, at the pressing place, a contact portion having a shape protruding from the housing toward the cover,
the cover and the housing are pressed each other in the directions separating from each other at the pressing place upon attachment of the cover to the housing due to an engagement of the locking portion and the locked portion in a state where the contact portion is in contact with the cover.

[3] A fusible link unit comprising: a fuse element including a plurality of fusible portions arrayed in a predetermined array direction; a housing holding the fuse element, and a plate-shaped cover attached to the housing,
the housing having: a window portion penetrating the housing in an intersecting direction to intersect the array direction; and locked portions provided at opposite ends of the window portion in the array direction, the housing holding the fuse element to locate the fusible portions inside the window portion,
the cover having a shape extending in the array direction and having locking portions provided at opposite ends of the cover in the array direction to fix the cover to the housing,
the fusible link unit being configured to attach the cover to the housing to cover the window portion due to an engagement of the locking portion and the locked portion by using the attachment structure according to the item [1] or the item [2].

According to first aspect of the invention, relating to the item [1], the cover is attached to the housing when the locking portion of the cover is engaged with the locked portion of the housing. On this occasion, in the pressing place distant from the engagement place between the locking portion and the locked portion, the cover and the housing are pressed in directions leaving each other (hereinafter also referred to as "separation directions" for convenience). In addition, between the pressing place and the engagement place, a space is formed between the cover and the housing. Due to such pressing in the pressing place, the locking portion wants to move in the separation direction in the engagement place between the locking portion and the locked portion. On the other hand, the movement of the locking portion in the separation direction is regulated by the locked portion. As a result, when the cover is attached to the housing, the state that the locking portion is pressed against the locked portion can be kept. Accordingly, relative movement (that is, looseness) between the cover and the housing is suppressed. Therefore, according to the attachment structure of the item [1], the attachment between the cover and the housing can be kept more proper than in the attachment structure used in the aforementioned background-art unit.

According to second aspect of the invention, relating to the item [2], the cover is pressed in the separation direction by the contact portion provided in the housing when the cover is attached to the housing. Accordingly, the attachment structure in the item [1] can be obtained without excessively complicating the structures of the cover and the housing. It is therefore possible to reduce the manufacturing cost of the cover and the housing, for example, without requiring excessive accuracy or adjustment frequency in molds for manufacturing the cover and the housing.

According to third aspect of the invention, relating to the item [3], relative movement (that is, looseness) between the cover and the housing is suppressed by use of the attachment structure of the item [1] or the item [2], in comparison with the background-art unit. Accordingly, the fusible link unit of the item [3] can keep the proper attachment between the cover and the housing, in comparison with the case where the attachment structure of the background-art unit is used.

According to the present invention, it is possible to provide an attachment structure capable of keeping proper attachment between a cover and a housing, and a fusible link unit using the attachment structure.

The invention has been described above concisely. The details of the invention will become more apparent when the description of the embodiments described below are read through with reference to the accompanying drawings.

BRIEF DESCRIPTION OF THE DRAWINGS

FIGS. 5A to 5C are configuration views of the rear cover shown in FIG. 2B, FIG. 5A being a perspective view of the rear cover, FIG. 5B being a three-plane drawing of the rear cover, FIG. 5C being an enlarged view of an end portion of the rear cover;

DETAILED DESCRIPTION

Embodiment

A fusible link unit including an attachment structure between a cover and a housing according to an embodiment of the invention will be described below.

Figure 1:
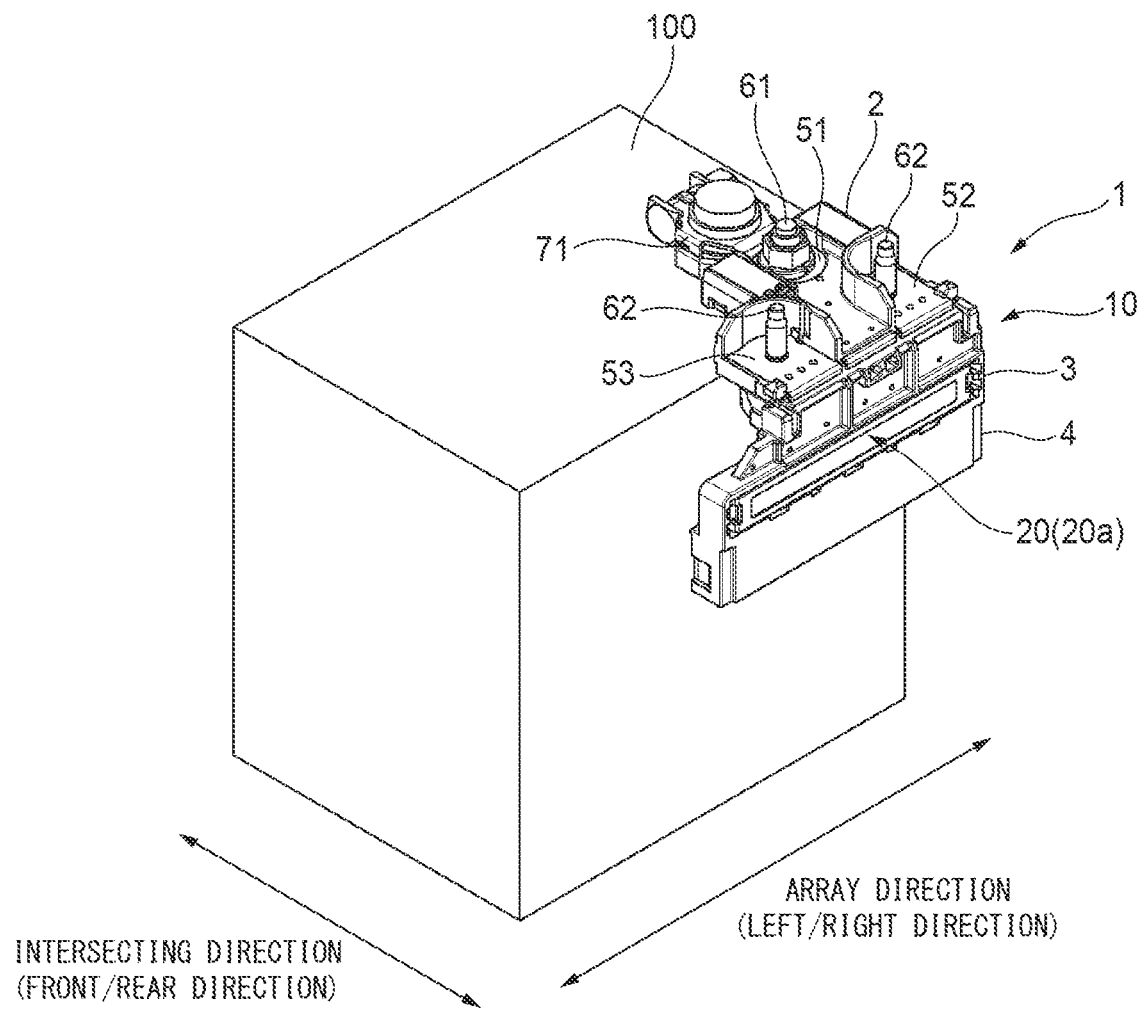
FIG. 1 is a perspective view showing a use state of a fusible link unit according to an embodiment of the invention.

As shown in FIG. 1, the fusible link unit 1 is attached to a battery 100 through a battery terminal 71. The battery 100 is mounted on an automobile or the like. The fusible link unit 1 has a horizontal block portion 2 and a vertical block portion 3. The horizontal block portion 2 is disposed on the upper surface side of the battery 100, and the vertical block portion 3 is suspended from an edge of the horizontal block portion 2 so as to be disposed along the side surface side of the battery 100. In a lower end portion of the vertical block portion 3, connector portions 4 for connecting connectors (not shown) attached to terminals of electric wires (not shown) connected to loads are disposed laterally in a line (in a line in a left/right direction viewed from the front). The left/right direction will be also referred to as "array direction". Further, a direction (front/rear direction of each connector portion 4) perpendicularly crossing the array direction will be also referred to as "intersecting direction".

Incidentally, in the embodiment, connectors (not shown) are connected to the vertical block portion 3 so that a plurality of terminal portions (not shown) stored inside the vertical block portion 3 can be electrically connected to terminals (not shown) stored in the connectors. However, the method for the electric connection between the both is not limited to such a method. For example, terminals (not shown) attached to terminals of electric wires may be fastened to the terminal portions stored in the vertical block portion 3 through bolts and nuts or the like so that the both can be electrically connected.

Figure 2A:
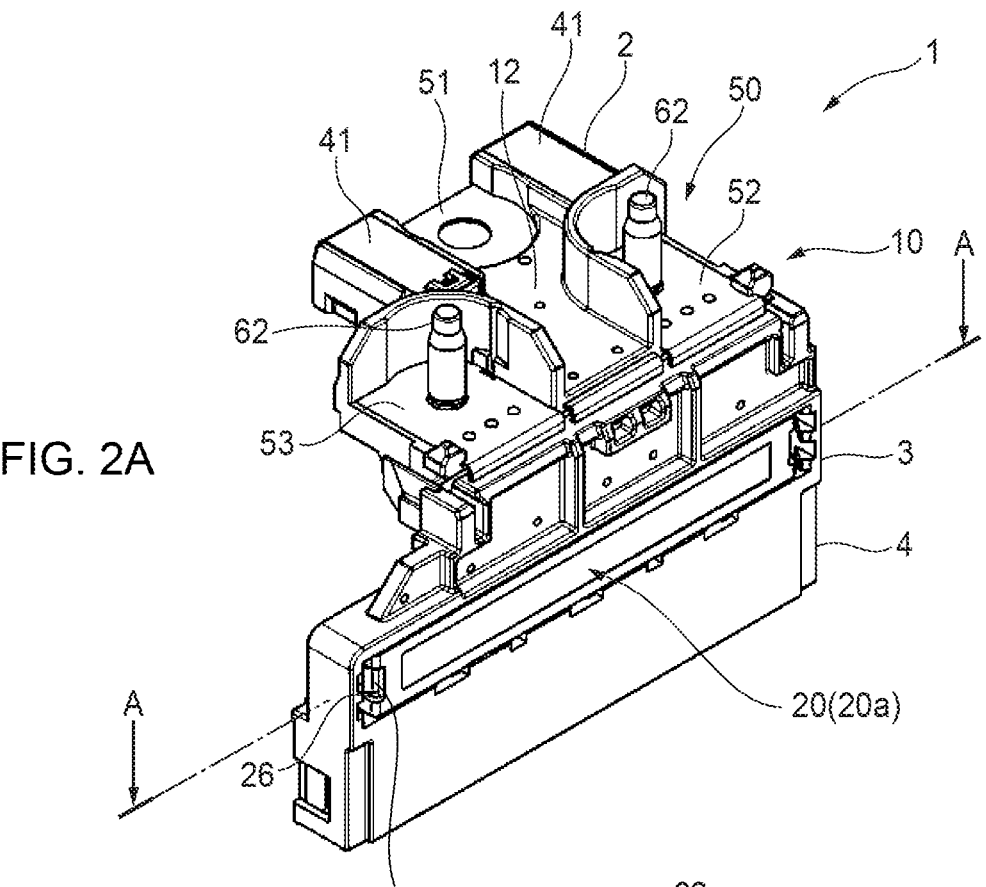
FIGS. 2A and 2B are configuration views of the fusible link unit shown in FIG. 1, FIG. 2A being a perspective view in which the unit is observed from its front, FIG. 2B being a perspective view in which the unit is observed from its rear.
Figure 2B:
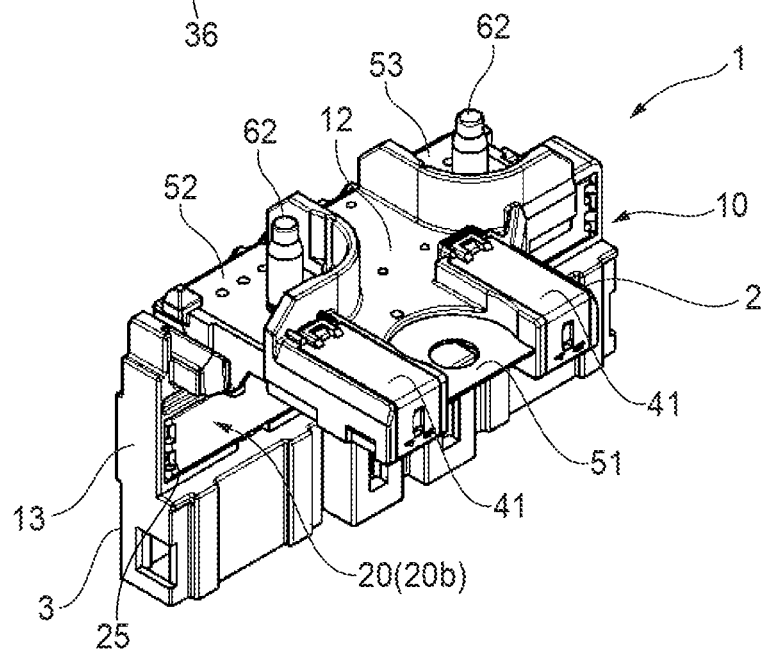

As shown in FIGS. 2A and 2B, the fusible link unit 1 includes a housing 10 made of an insulating resin, and a bus bar 50 whose main portion is buried inside the housing 10 in a state where terminal portions 51 to 53 and a plurality of load-side terminal portions (terminal portions stored inside the vertical block portion 3) are exposed to the outside. The terminal portion 51 is to be connected to the battery 100 through the battery terminal 71. The terminal portion 52 is to be connected to an alternator. The terminal portion 53 is to be connected to an accessory of a vehicle or the like. Incidentally, as shown in FIG. 1, the battery terminal 71 is connected to the terminal portion 51 by use of a bolt 61 (see FIG. 1), a terminal (not shown) connected to the alternator is connected to the terminal portion 52 by use of a fastening bolt 62 etc., and a terminal (not shown) connected to an accessory of the vehicle or the like is connected to the terminal portion 53 by use of a fastening bolt 62 etc.

The bus bar 50 is a circuit body in which a metal plate has been punched out. The bus bar 50 is integrated with the housing 10 by insert-molding to the housing 10. The housing 10 has a horizontal plate-shaped portion 12 corresponding to the horizontal block portion 2, and a wall portion 13 having a thickness in the front/rear direction (the same direction as the intersecting direction in this embodiment) correspondingly to the vertical block portion 3 and formed into a rectangular shape viewed from the front.

In the bus bar 50, a plurality of fuse elements 55 (see FIGS. 3A-3C and FIGS. 4A-4C) are integrally formed so as to connect the terminal portions 51 and 52 with a plurality of terminal portions stored inside the vertical block portion 3. Each of the fuse elements 55 has a fusible portion 56. The plural fuse elements 55 are disposed and arrayed in the aforementioned array direction (which is herein the left/right direction when the fusible link unit 1 is viewed from the front). The fuse elements 55 are stored inside the wall portion 13 of the housing 10 forming the vertical block portion 3. The plural terminal portions stored inside the vertical block portion 3 are provided as connector terminals in the connector portion 4 of the lower end of the vertical block portion 3 so as to be located below the fuse elements 55.

As shown in FIGS. 3A-3C and FIGS. 4A-4C, window portions 19 are provided in a wall portion 13 storing the fuse elements 55 in the housing 10, so as to penetrate the wall portion 13 from a front wall surface 14 to a rear wall surface 15. To say in other words, the window portions 19 are provided to penetrate the housing 10 in an intersecting direction (which is herein the front/rear direction when the fusible link unit 1 is viewed from the front) crossing the array direction of the fuse elements 55 (fusible portions 56). More specifically, the window portions 19 are provided as a plurality of through holes arrayed in the array direction (left/right direction) of the fuse elements 55 (fusible portions 56). The front wall surface 14 and the rear wall surface 15 are a front wall surface and a rear wall surface of frame walls constituting the window portions 19 (through holes) of the housing 10 respectively.

Figure 3A:
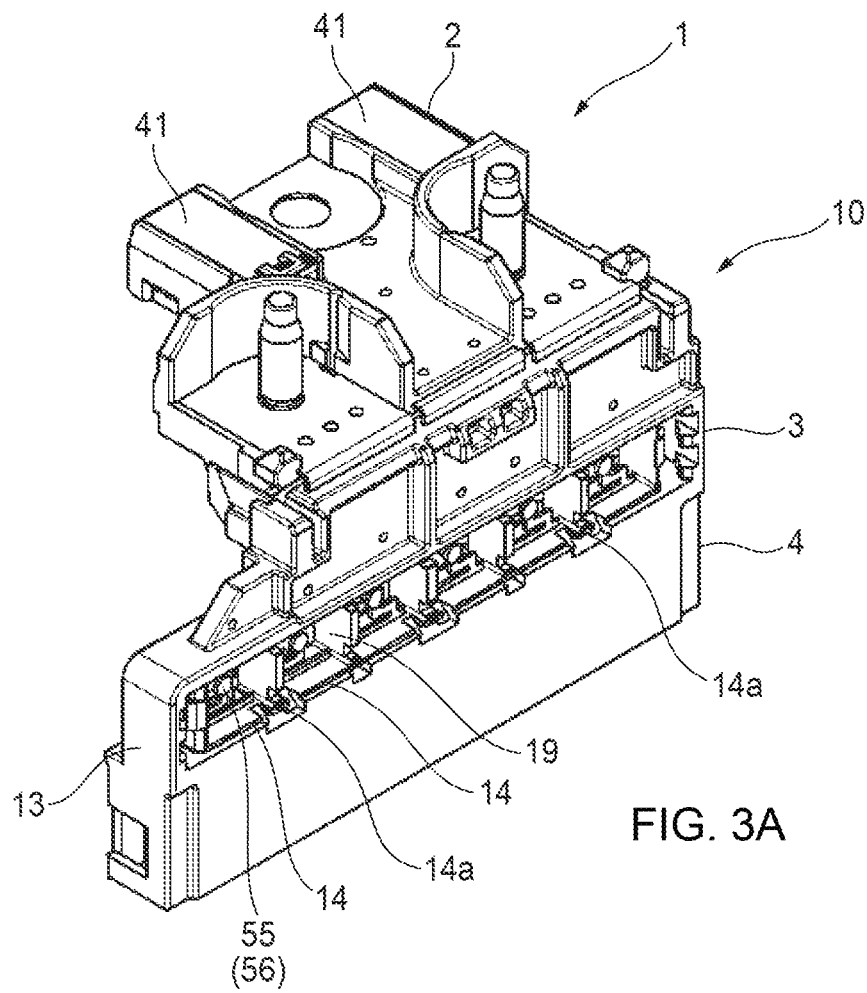
FIG. 3A is a view corresponding to FIG. 2A in a state where a front cover has been removed.
Figure 3B:
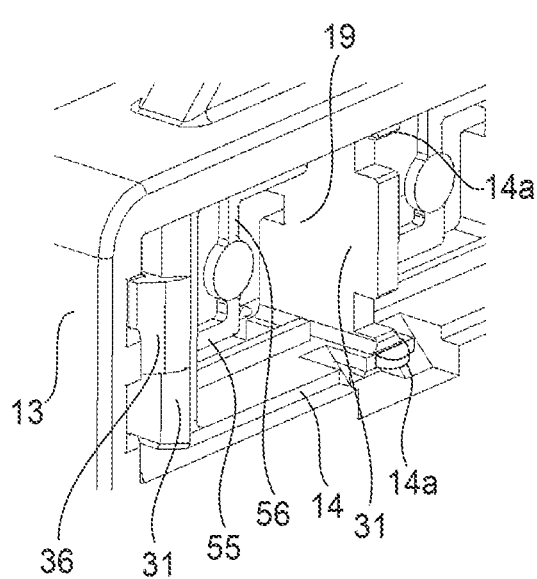
FIG. 3B is an enlarged view of an end portion of a housing shown in FIG. 3A.
Figure 3C:
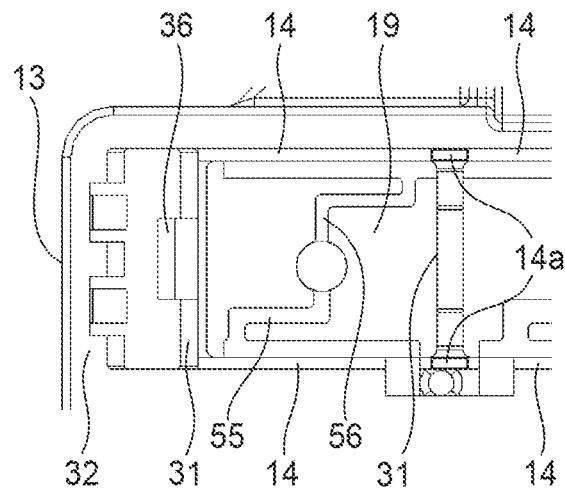
FIG. 3C is a front view of the end portion of the housing shown in FIG. 3B.
Figure 4A:
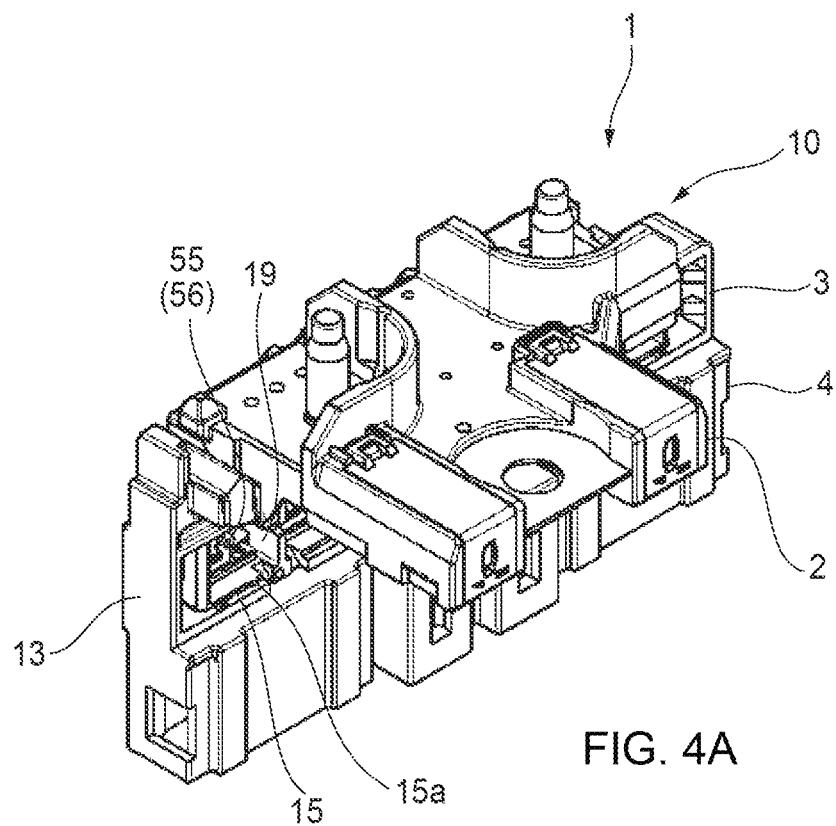
FIG. 4A is a view corresponding to FIG. 2B in a state where a rear cover has been removed.
Figure 4B:
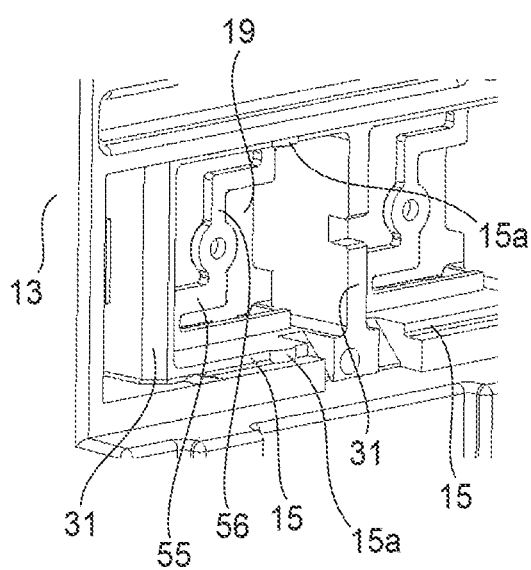
FIG. 4B is an enlarged view of an end portion of a housing shown in FIG. 4A.
Figure 4C:
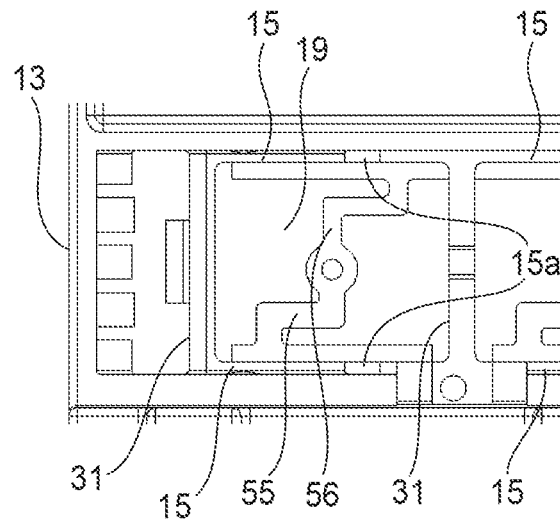
FIG. 4C is a front view of the end portion of the housing shown in FIG. 4B.

As shown in FIGS. 3A-3C, in the embodiment, protruding contact portions 14a protruding on the front side are provided integrally in upper and lower positions (four places in total) displaced inward in the array direction by predetermined distances from opposite end portions of the front wall surface 14 in the array direction respectively. In the same manner, as shown in FIGS. 4A-4C, in the embodiment, protruding contact portions 15a protruding on the rear side are provided integrally in upper and lower positions (four places in total) displaced inward in the array direction by predetermined distances from opposite end portions of the rear wall surface 15 in the array direction respectively. The operation and effect of the contact portions 14a and 15a provided thus will be described later.

The fuse elements 55 having the fusible portions 56 (fusion portions) are stored inside the window portions 19 respectively. That is, the housing 10 stores a bus bar 50 so that the fusible portions 56 of the fuse elements 55 are exposed from the window portions 19. Incidentally, fuse elements (not shown) having similar or different configurations to or from the fuse elements 55 are also stored inside a cover 41 attached to the horizontal block 2.

To the front surfaces of the window portions 19, a front cover 20a made of a transparent resin is attached to the housing 10 so as to close front opening portions of the window portions 19 (see FIG. 2A). The front cover 20a is formed into a plate-shaped shape long from side to side (that is, a plate-shaped shape extending along the array direction of the fusible portions 56) correspondingly to the shape of the front opening portions of the window portions 19. The front cover 20a is transparent so that the fusible portions 56 of the fuse elements 55 can be visually recognized from the external front. A transparent and heat-resistant resin material (such as PESU or PAR) can be used as the material of the front cover 20a. Such a transparent resin is generally more expensive than an opaque resin which will be described later.

To the rear surfaces of the window portions 19, a rear cover 20b made of an opaque resin is attached to the housing 10 so as to close rear opening portions of the window portions 19 (see FIG. 2B). In the same manner as the front cover 20a, the rear cover 20b is also formed into a plate-shaped shape long from side to side (that is, a plate-shaped shape extending along the array direction of the fusible portions 56) correspondingly to the shape of the rear opening portions of the window portions 19. A resin material (such as PS-S or PA6T) which contains glass fibers and which is opaque and excellent in strength and heat resistance can be used as the material of the rear cover 20b. Incidentally, a material containing reinforcing fibers (such as carbon fibers) other than glass fibers may be used as the material of the rear cover 20b.

First, of the front cover 20a and the rear cover 20b, the configuration of the rear cover 20b and the configuration of a place to which the rear cover 20b is attached in the housing 10 will be described in detail.

As shown in FIGS. 5A-5C, the rear cover 20b is integrally provided with a body portion 21 and a pair of locking portions 22. The body portion 21 has a long, narrow and flat plate-shaped shape with a length large enough to close the rear opening portions (that is, the plural through holes arrayed in the array direction) of the window portions 19. The body portion 21 extends in the array direction. The locking portions 22 protrude from the opposite end portions of the body portion 21 in a direction perpendicular to the plate surface of the body portion 21 (that is, in an attachment direction of the rear cover 20b). The locking portions 22 play a role to fix the rear cover 20b to the housing 10 when the rear cover 20b is attached to the housing 10 (specifically to the rear opening portions of the window portions 19).

Each locking portion 22 is constituted by an insertion piece 23 and an inclined connection portion 24. The insertion piece 23 extends in a direction perpendicular to the plate surface of the body portion 21. The inclined connection portion 24 connects the insertion piece 23 with the body portion 21 and extends in an inclined direction to the plate surface of the body portion 21. In the locking portion 22 (more specifically the inclined connection portion 24), a pair of lock holes 25 penetrating the locking portion 22 in the array direction are provided to be arrayed at a predetermined distance from each other in the up/down direction.

Figure 6A:
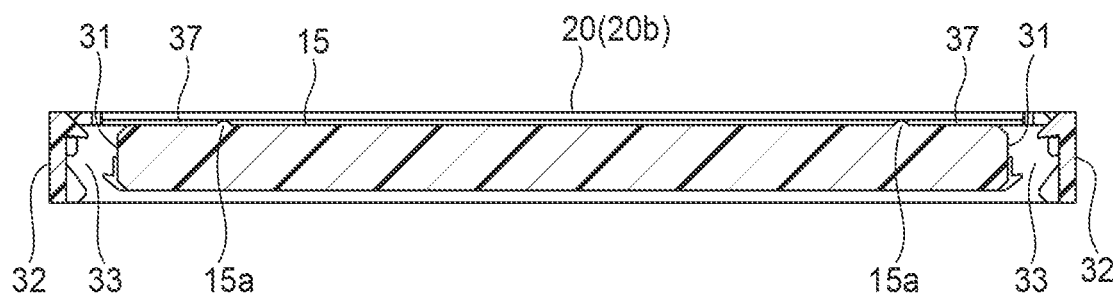
FIG. 6A is a view corresponding to a section taken on line A-A in FIG. 2A, showing the housing to which the rear cover has been attached.
Figure 6B:
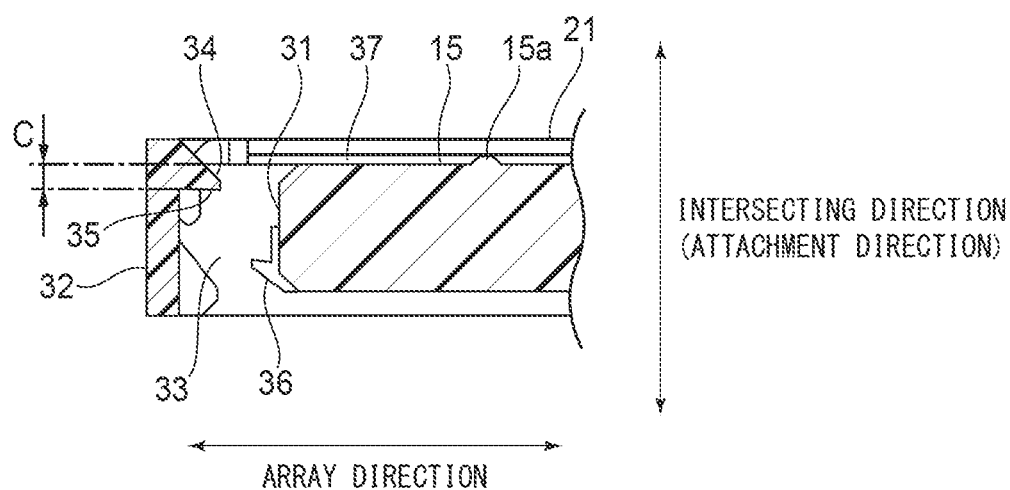
FIG. 6B is an enlarged view of an end portion of the housing shown in FIG. 6A.

As shown in FIGS. 6A and 6B, as a partner-side configuration for fixing (engaging with) the locking portions 22, a partition wall 31 and a side wall 32 are provided in the wall portion 13 of the housing 10 near each of the opposite ends of the windows 19 in the array direction so as to be arranged adjacently to each other in the array direction. The partition wall 31 is located outside in the array direction in the frame wall defining, of the window portions 19, a though hole at the outermost position in the array direction. The side wall 32 constitutes an end portion of the wall portion 13 in the array direction. The partition wall 31 and the side wall 32 extend in parallel with the up/down direction and the intersecting direction. An insertion hole 33 is formed between the partition wall 31 and the side wall 32 so as to penetrate the wall portion 13 in the intersecting direction. When the rear cover 20b is attached to the housing 10 along the attachment direction (intersecting direction), the locking portions 22 of the rear cover 20b are inserted into the insertion holes 33.

As shown in FIG. 6B, in the rear end portion of the inner surface of each side wall 32 in the array direction, a pair of engagement convex portions 34 protruding inward in the array direction (that is, protruding from the inner wall surface of a corresponding one of the insertion holes 33) are provided to be arrayed at a predetermined distance from each other in the up/down direction correspondingly to the pair of lock holes 25. A lock surface 35 extending in parallel with the up/down direction and the array direction is formed in the front side surface of each engagement convex portion 34.

Here, a dimension B (a distance in the intersecting direction between a front end (attachment advance side end) of the inner wall surface of each lock hole 25 in the rear cover 20b and a side surface on the attachment advance side of the rear cover 20b in the body portion 21 of the rear cover 20b)

shown in FIG. 5C is slightly smaller than a dimension C (a distance in the intersecting direction between the lock surface 35 of each engagement convex portion 34 of the housing 10 and the rear wall surface 15 of the housing 10) shown in FIG. 6B (B<C). The effect obtained by the distances B and C set thus will be explained in the following description.

Next, description will be made about the attachment procedure of the rear cover 20b to the housing 10. To attach the rear cover 20b to the housing 10, the pair of insertion pieces 23 of the rear cover 20b are first inserted into the pair of insertion holes 33 located in the opposite end portions of the housing 10 in the array direction from the rear side along the attachment direction (intersecting direction).

In the initial stage of the insertion, the insertion pieces 23 abut against the engagement convex portions 34. When the insertion advances further, the rear cover 20b is elastically deformed to make the insertion pieces 23 approach each other inward in the array direction, so that the insertion pieces 23 ride on the engagement convex portions 34. As soon as the lock holes 25 arrive at the positions of the engagement convex portions 34 with further advance of the insertion, the rear cover 20b elastically returns so that the lock holes 25 are fitted into the engagement convex portions 34. Thus, as shown in FIGS. 6A and 6B, the attachment of the rear cover 20b to the housing 10 is completed.

In the state where the rear cover 20b has been attached to the housing 10 (see FIG. 6A), due to the relationship of B<C, the front ends 25a of the lock holes 25 of the rear cover 20b abut against the lock surfaces 35 of the engagement convex portions 34 in the state where the opposite end portions in the array direction of the body portion 21 of the rear cover 20b are slightly elastically deformed on the housing 10 side (front side) with the contact portions 15 as fulcrums, while the body portion 21 of the rear cover 20b abuts against the contact portions 15a of the rear wall surface 15 of the housing 10. In each of the contact places (engagement places) between the front ends 25a of the lock holes 25 and the lock surfaces 35 of the engagement convex portions 34 and the pressure contact places (pressing places) between the body portion 21 and the contact portions 15a of the rear wall surface 15, the pieces to contact each other (in each of the contact places and the pressure contact places) are brought into pressure contact with each other along the intersecting direction due to the elastic return of the rear cover 20b.

Between each engagement place and a pressing place corresponding thereto, a space 37 is formed between the rear cover 20b (specifically the body portion 21) and the housing 10 (specifically the rear wall surface 15) so as to prevent the rear cover 20b (specifically the body portion 21) and the housing 10 (specifically the rear wall surface 15) from touching each other (see FIG. 6A).

As described above, pressure contact is established in each of the engagement places and the pressing places so that the state where the pairs of lock holes 25 (locking portions 22) are pressed against the pairs of engagement convex portions 34 (locked portions) can be kept. As a result, looseness can be suppressed in the engagement places between the locking portions 22 and the locked portions.

The configuration of the rear cover 20b and the configuration of the place to which the rear cover 20b is attached in the housing 10 have been described above. Next, the configuration of the front cover 20a and the place to which the front cover 20a is attached in the housing 10 will be described briefly.

The shape of the front cover 20a is the same as the shape of the rear cover 20b, except that the dimension thereof in the array direction is slightly shorter than that of the rear cover 20b, and a single lock hole 26 (see FIG. 2A) is provided as a lock hole in place of each pair of lock holes 25.

As the partner-side configuration to which the lock hole 26 is fixed (engaged), an engagement convex portion 36 (see FIG. 6B) is provided in the front end portion of each partition wall 31 of the housing 10 correspondingly to the lock hole 26 so as to protrude toward the outside in the array direction (that is, protrude from the inner wall surface of the insertion hole 33).

Next, the attachment procedure of the front cover 20a to the housing 10 will be described. First, to attach the front cover 20a to the housing 10, the pair of insertion pieces 23 of the front cover 20a are inserted into the pair of insertion holes 33 located in the opposite end portions of the housing 10 in the array direction from the front side along the attachment direction (intersecting direction).

In the initial stage of the insertion, the insertion pieces 23 abut against the engagement convex portions 36. When the insertion advances further, the front cover 20a is elastically deformed to make the insertion pieces 23 go away from each other outward in the array direction, so that the insertion pieces 23 ride on the engagement convex portions 36. As soon as the lock holes 26 arrive at the positions of the engagement convex portions 36 with further advance of the insertion, the front cover 20a elastically returns so that the lock holes 26 are fitted into the engagement convex portions 36. Thus, as shown in FIGS. 2A, the attachment of the front cover 20a to the housing 10 is completed.

In the state where the front cover 20a has been attached to the housing 10 (see FIG. 2A), in the same manner as in the rear cover 20b, the lock holes 26 of the front cover 20a abut against the engagement convex portions 36 in the state where the opposite end portions in the array direction of the body portion 21 of the front cover 20a are slightly elastically deformed on the housing 10 side (rear side), while the body portion 21 of the front cover 20a abuts against the contact portions 14a (see FIGS. 3A-3C) of the front wall surface 14 of the housing 10. In each of the contact places (engagement places) between the lock holes 26 and the engagement convex portions 36 and the pressure contact places (pressing places) between the body portion 21 and the contact portions 14a of the front wall surface 14, the pieces to contact each other (in each of the contact places and the pressure contact places) are brought into pressure contact with each other along the intersecting direction due to the elastic return of the front cover 20a.

Between each engagement place and a pressing place corresponding thereto, similarly to the rear cover 20b, a space is formed between the front cover 20a (specifically the body portion 21) and the housing 10 (specifically the front wall surface 14) so as to prevent the front cover 20a (specifically the body portion 21) and the housing 10 (specifically the front wall surface 14) from touching each other.

As described above, pressure contact is established in each of the engagement places and the pressing places so that the state where the lock holes 26 (locking portions 22) are pressed against the engagement convex portions 36 (locked portions) can be kept. As a result, looseness can be suppressed in the engagement places between the locking portions 22 and the locked portions.

As has been described above, in the fusible link unit 1 including the attachment structure between the cover and the housing according to the embodiment of the invention, the locking portions 22 (the lock holes 25 and the lock holes 26) of the cover (the front cover 20a and the rear cover 20b) are engaged with the locked portions (the engagement convex portions 34 and the engagement convex portions 36) of the housing 10 so that the cover can be attached to the housing 10. On this occasion, in each of the pressing places (the pressure contact places between the body portion 21 of the front cover 20a and the contact portions 14a of the front wall surface 14 and the pressure contact places between the body portion 21 of the rear cover 20b and the contact portions 15a of the rear wall surface 15) far from the engagement places between the locking portions 22 and the locked portions, the cover and the housing 10 are pressed in directions to leave each other, and a space is formed between the cover and the housing 10 and between each pressing place and an engagement place corresponding thereto. Accordingly, due to the pressure, the state where the locking portions 22 have been pressed against the locked portions can be kept. As a result, looseness can be suppressed in each of the engagement places between the locking portions 22 and the locked portions. Therefore, the fusible link unit 1 including the attachment structure configured thus can keep the attachment between the cover and the housing 10 more proper than in the attachment structure used in the aforementioned background-art unit.

Other Embodiments

The invention is not limited to the above embodiment and various modifications, improvements, etc. can be made as appropriate within the scope of the invention. The materials, shapes, sets of dimensions, numbers, locations, etc. of the respective constituent elements of the above embodiment are not limited to those disclosed but can be determined in desired manners as long as the invention can be implemented.

Figure 7:
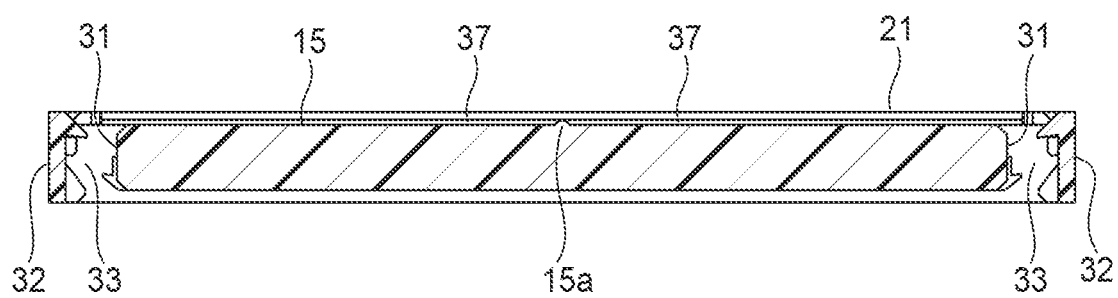
FIG. 7 is a view corresponding to FIG. 6A according to another embodiment of the invention.

For example, in the aforementioned embodiment, the contact portions 15a are provided at two places in the array direction and two places in the up/down direction (that is, four places in total) near the opposite end portions in the array direction of the rear wall surface 15. However, for example, as shown in FIG. 7, the contact portions 15a may be provided at one place in the array direction and two places in the up/down direction (that is, two places in total) near the center in the array direction of the rear wall surface 15. In this manner, the number and layout of contact portions 15a may be determined suitably in accordance with the size or the like of the fusible link unit 1. The same thing can be applied to the contact portions 15b.

Further, in the aforementioned embodiment, the contact portions 14a and the contact portions 15a are provided in the housing 10. However, a configuration corresponding to the contact portions 14a and a configuration corresponding to the contact portions 15a may be provided in the cover (the front cover 20a and the rear cover 20b).

Further, in the fusible link unit 1 according to the aforementioned embodiment, the front cover 20a is made of a transparent resin, and the rear cover 20b is made of an opaque resin. However, both the front cover 20a and the rear cover 20b may be made of a transparent resin.

Further, in the aforementioned embodiment, in the cover (the front cover 20a and the rear cover 20b), each locking portion 22 is constituted by an insertion piece 23 and an inclined connection portion 24, and the inclined connection portion 24 is connected to the body portion 21 of the cover 20. However, in the cover 20, the insertion piece 23 and the body portion 21 may be connected directly without the inclined connection portion 24.

Here, the features of the aforementioned embodiment of the attachment structure between the cover and the housing and the fusible link unit 1 according to the invention will be summarized and listed briefly in the following items [1] to [3].

[1] An attachment structure comprising a housing (10) and a plate-shaped cover (20a, 20b) attached to the housing (10),
the cover (20a, 20b) having a locking portion (22) to fix the cover (20a, 20b) to the housing (10),
the housing (10) having a locked portion (34, 36) engaged with the locking portion (22) to regulate a movement of the cover (20a, 20b) in a direction separating from the housing (10),
the attachment structure being configured to engage the locking portion (22) and the locked portion (34, 36) at an engagement place while the cover (20a, 20b) and the housing (10) being pressed each other in directions separating from each other at a pressing place distant from the engagement place, and to form a space (37) between the cover (20a, 20b) and the housing (10) in a region between the pressing place and the engagement place, upon attachment of the cover (20a, 20b) to the housing (10).

[2] The attachment structure according to the item [1], wherein
the housing (10) has, at the pressing place, a contact portion (14a, 15a) having a shape protruding from the housing (10) toward the cover (20a, 20b),
the cover (20a, 20b) and the housing (10) are pressed each other in the directions separating from each other at the pressing place upon attachment of the cover (20a, 20b) to the housing (10) due to an engagement of the locking portion (22) and the locked portion (34, 36) in a state where the contact portion (14a, 15a) is in contact with the cover (20a, 20b).

[3] A fusible link unit (1) comprising: a fuse element (55) including a plurality of fusible portions (56) arrayed in a predetermined array direction; a housing (10) holding the fuse element (55), and a plate-shaped cover (20a, 20b) attached to the housing (10),
the housing (10) having: a window portion (19) penetrating the housing (10) in an intersecting direction to intersect the array direction; and locked portions (34, 36) provided at opposite ends of the window portion (19) in the array direction, the housing (10) holding the fuse element (55) to locate the fusible portions (56) inside the window portion (19),
the cover (20a, 20b) having a shape extending in the array direction and having locking portions (22) provided at opposite ends of the cover (20a, 20b) in the array direction to fix the cover (20a, 20b) to the housing (10),
the fusible link unit (1) being configured to attach the cover (20a, 20b) to the housing (10) to cover (20a, 20b) the window portion (19) due to an engagement of the locking portion (22) and the locked portion (34, 36) by using the attachment structure according to the item [1] or the item [2].

REFERENCE SIGNS LIST 1 fusible link unit
10 housing
14a contact portion
15a contact portion
19 window portion 20a front cover (cover)
20b rear cover (cover)
22 locking portion
34 engagement convex portion (locked portion)
36 engagement convex portion (locked portion)
37 space
55 fuse element
56 fusible portion

The invention claimed is:

1. An attachment structure comprising: a housing; and a plate-shaped cover attached to the housing,
   the cover having a locking portion to fix the cover to the housing,
   the housing having a locked portion engaged with the locking portion to regulate a movement of the cover in a direction separating from the housing,
   the attachment structure being configured to engage the locking portion and the locked portion at an engagement place while the cover and the housing are urged in directions separating from each other at a pressing place distant from the engagement place, and to form a space between the cover and the housing in a region between the pressing place and the engagement place, upon attachment of the cover to the housing.

2. The attachment structure according to claim 1, wherein the housing has, at the pressing place, a contact portion having a shape protruding from the housing toward the cover, the cover and the housing are pressed each other in the directions separating from each other at the pressing place upon attachment of the cover to the housing due to an engagement of the locking portion and the locked portion in a state where the contact portion is in contact with the cover.

3. A fusible link unit comprising: a fuse element including a plurality of fusible portions arrayed in a predetermined array direction; a housing holding the fuse element, and a plate-shaped cover attached to the housing,
   the housing having: a window portion penetrating the housing in an intersecting direction to intersect the array direction; and locked portions provided at opposite ends of the window portion in the array direction, the housing holding the fuse element to locate the fusible portions inside the window portion,
   the cover having a shape extending in the array direction and having locking portions provided at opposite ends of the cover in the array direction to fix the cover to the housing,
   the fusible link unit being configured to attach the cover to the housing to cover the window portion due to an engagement of the locking portion and the locked portion by using the attachment structure according to claim 1.

* * * * *